(12) United States Patent
Oguri et al.

(10) Patent No.: US 8,256,564 B2
(45) Date of Patent: Sep. 4, 2012

(54) VEHICLE AND VEHICLE EXHAUST PIPE

(75) Inventors: Kiyohiko Oguri, Iwata (JP); Masato Yokoi, Iwata (JP); Makoto Nakazawa, Iwata (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 475 days.

(21) Appl. No.: 12/461,341

(22) Filed: Aug. 7, 2009

(65) Prior Publication Data

US 2010/0032227 A1    Feb. 11, 2010

(30) Foreign Application Priority Data

Aug. 8, 2008    (JP) ................................. 2008-206375

(51) Int. Cl.
*B60K 13/04*    (2006.01)
(52) U.S. Cl. ........................................ 180/309; 180/296
(58) Field of Classification Search ................... 180/296, 180/309, 225
See application file for complete search history.

(56) References Cited

U.S. PATENT DOCUMENTS

| 4,537,280 | A | * | 8/1985 | Roberts | 181/243 |
| 5,016,725 | A | * | 5/1991 | Muramatsu | 180/225 |
| 2007/0277517 | A1 | * | 12/2007 | Yamakura et al. | 60/323 |
| 2008/0110687 | A1 | * | 5/2008 | Miyashiro et al. | 180/296 |

FOREIGN PATENT DOCUMENTS

JP    60-045428    3/1985

* cited by examiner

*Primary Examiner* — John R Olszewski
(74) *Attorney, Agent, or Firm* — Rabin & Berdo, P.C.

(57) ABSTRACT

A vehicle, such as a motorcycle, can include an exhaust pipe connected to a back or rear side of an engine of the vehicle. A rear cushioning member can be provided between the engine and a rear wheel of the vehicle. The exhaust pipe can include a front portion that extends from the engine backward on one side of the rear cushioning member, with respect to a widthwise direction of the vehicle, and a transverse portion that extends, in a direction substantially transverse to a lengthwise direction of the vehicle, from the one side to another side, between the rear cushioning member and the rear wheel.

8 Claims, 20 Drawing Sheets

VEHICLE AND VEHICLE EXHAUST PIPE

CROSS-REFERENCE TO RELATED APPLICATIONS

This application claims priority under 35 U.S.C. §119 from Japanese Patent Application No. 2008-206375, filed Aug. 8, 2008, the entirety of which is incorporated herein by reference.

BACKGROUND OF THE INVENTION

1. Field of the Invention

Embodiments of the present invention relate to a vehicle and an exhaust pipe for the vehicle. The vehicle can be a motorcycle, for example. More specifically, the embodiments relate to a vehicle that includes an exhaust pipe connected to a back side of an engine.

2. Background

There are known motorcycles that have an exhaust pipe connected to a back side of an engine. JP S60-45428 A discloses a motorcycle including an engine having an outlet port at a back side thereof, and an exhaust pipe connected to the outlet port. An exhaust chamber is connected to the exhaust pipe of the motorcycle and the exhaust chamber is provided behind and under the engine. The exhaust pipe of the motorcycle is formed to extend backward and downward from the outlet port of the engine.

SUMMARY OF THE INVENTION

Embodiments of the present invention relate to a vehicle and an exhaust pipe for the vehicle. According to the embodiments, an exhaust pipe of the vehicle can have a sufficient length even though the exhaust pipe is connected to a back side of an engine of the vehicle. Moreover, a minimum ground clearance of the vehicle can be maintained at a desired level.

In embodiments, the vehicle can be a motorcycle. A motorcycle according to the embodiments can include an engine, a rear wheel provided behind the engine, a rear cushioning member provided between the engine and the rear wheel, and an exhaust pipe connected to the back side of the engine. The exhaust pipe can include a first portion that extends backward on one side of the rear cushioning member, with respect to a widthwise direction of the motorcycle, and a second portion provided on a downstream side of the first portion and extending, substantially transversely to a lengthwise direction of the motorcycle, from the one side to another side, between the rear cushioning member and the rear wheel.

According to other embodiments of the invention, a motorcycle can include an engine, a rear wheel provided behind the engine, a rear cushioning member provided between the engine and the rear wheel, and an exhaust pipe connected to the back side of the engine. The exhaust pipe can include a first portion that extends backward on one side of the rear cushioning member, with respect to a widthwise direction of the motorcycle, and a second portion provided on a downstream side of the first portion and extending backward in a spiral shape between the rear cushioning member and the rear wheel.

With the above-described structures, even though the exhaust pipe is connected to the back side of the engine, the exhaust pipe can have an increased length without reducing the minimum ground clearance of the motorcycle body. More specifically, by forming transverse and spiral extents in the exhaust pipe, the exhaust pipe can have a greater length than would be the case if the exhaust pipe were to extend linearly between the rear cushioning member and the rear wheel.

In light of the foregoing, further embodiments of the invention relate to an exhaust pipe for a vehicle, where the exhaust pipe can comprise a forward portion to connect to a rear part of an engine, a transverse portion to extend from the forward portion along a direction substantially transverse to a lengthwise direction of the vehicle, and an exhaust portion to extend from the transverse portion toward a rear of the vehicle.

Still further embodiments of the invention relate to an exhaust pipe for a vehicle, where the exhaust pipe can comprise a forward portion to connect to a rear part of an engine, a spiral portion including at least one loop to extend from the forward portion, and an exhaust portion to extend from the spiral portion toward a rear of the vehicle.

Other features, elements, steps, characteristics and advantages of the present invention will become more apparent from the following detailed description of embodiments of the invention with reference to the attached drawings.

DETAILED DESCRIPTION OF THE INVENTION

Figure 1:
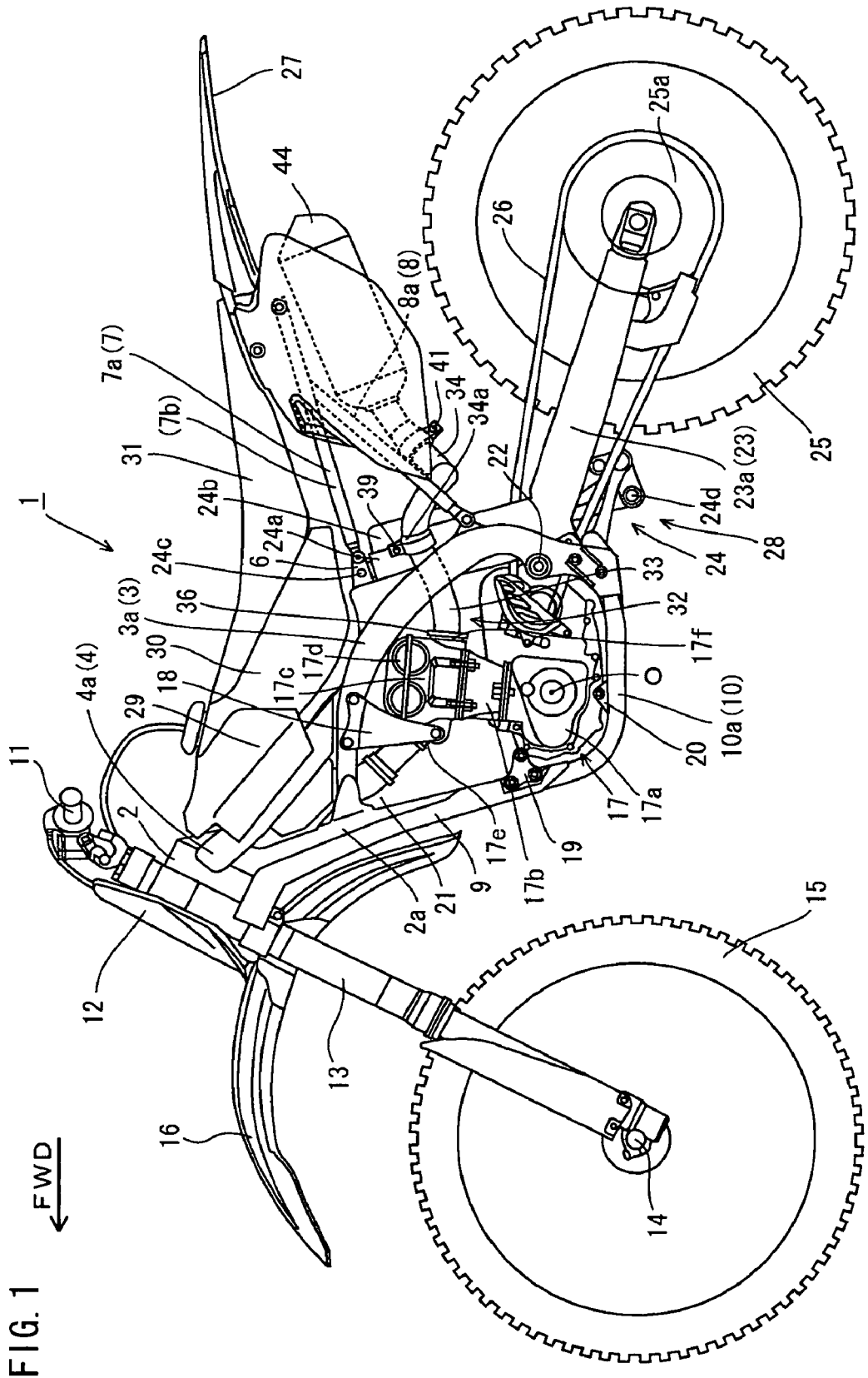
FIG. 1 is a left side view of a motorcycle according to a first embodiment of the present invention.

The invention will now be described in more detail by way of example with reference to the embodiments shown in the accompanying Figures. It should be kept in mind that the following described embodiments are only presented by way of example and should not be construed as limiting the inventive concept to any particular physical configuration. It should further be understood that "exemplary" as used herein means "serving as an example, instance or illustration." Any aspect referred to herein as "exemplary" is not necessarily to be construed as preferred over other aspects.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially," "essentially," "nearly" and "approximately" means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

Additionally, the following description includes references to directions, such as "front," "ahead," "back," "rear," "behind," "right," "left," "upward," "downward," "forward," "backward," "widthwise," "lengthwise," "horizontal" and "vertical." As used herein, these terms reflect the perspective of a person facing in the direction indicated by the arrow labeled "FWD" in the drawings, such as a rider seated on or straddling the motorcycle 1 and facing toward the front wheel 15. Thus, the arrow labeled "FWD" indicates a back-to-front direction relative to the motorcycle 1, or an advancing direction of the motorcycle 1. A direction specified as "left" or "right" in the description refers to left or right with respect to the back-to-front or advancing direction (FWD). "Widthwise" corresponds to a direction substantially transverse to the FWD or back-to-front direction. "Lengthwise" (with respect to the motorcycle 1) corresponds substantially the FWD or back-to-front (or front-to-back) direction. "Vertical" refers to a direction substantially transverse to both the widthwise and back-to-front directions, and corresponds substantially to "upward" and/or "downward." "Horizontal" refers to a direction substantially transverse to the vertical direction.

The following describes exemplary first and second embodiments of the present invention with reference to the accompanying drawings. As previously described, the embodiments relate to a vehicle, such as a motorcycle, and may more particularly relate to an off-road-type motorcycle. However, embodiments of the invention are not limited to a particular type of vehicle or motorcycle. For example, embodiments of the invention can be implemented in an on-road-type motorcycle, such as a motor scooter, or in other types of vehicles such as an automobile, a tricycle, or an ATV (All Terrain Vehicle).

FIRST EMBODIMENT

Figure 2:
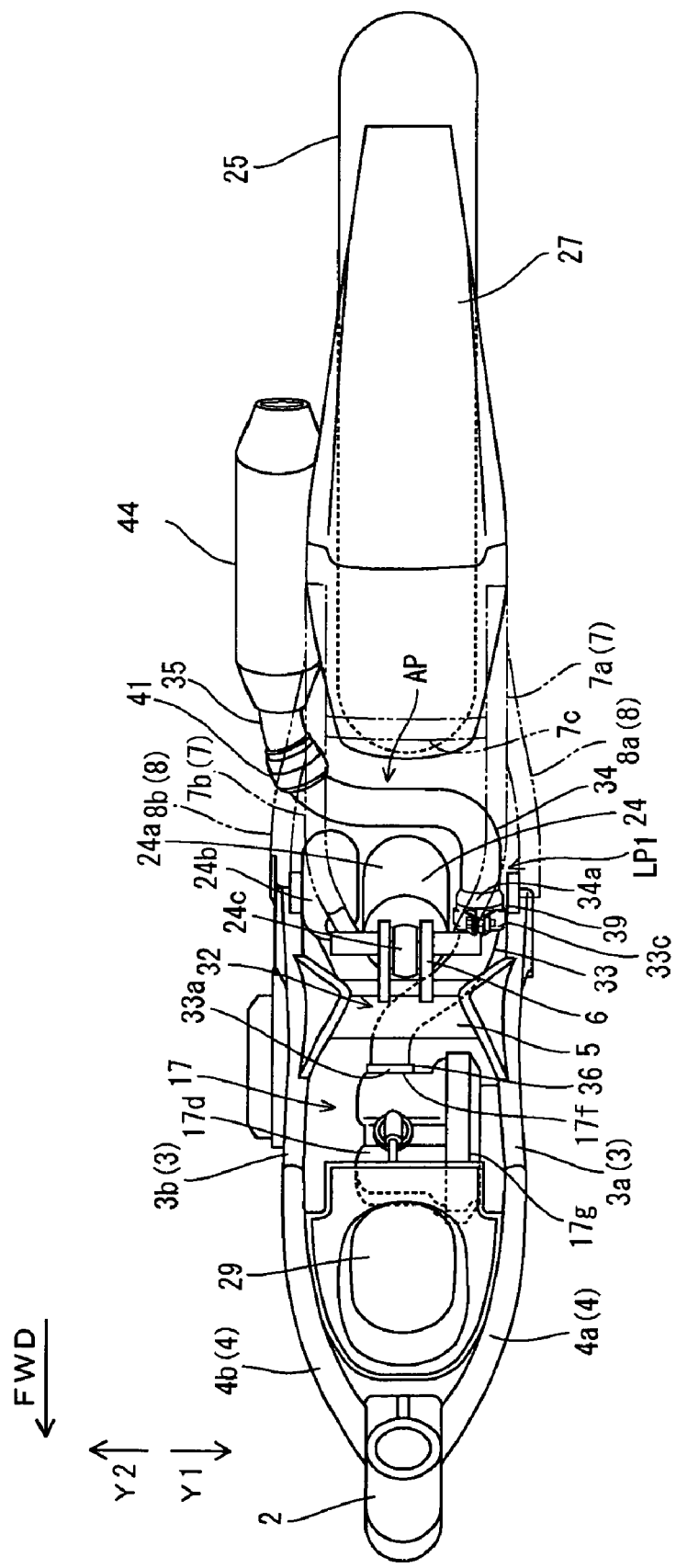
FIG. 2 is a plan view of the motorcycle according to the first embodiment.

Referring to FIGS. 1 to 15, a motorcycle 1 according to the first embodiment of the present invention will be described. FIG. 1 is a left side view of the motorcycle 1. FIG. 2 is a plan view of the motorcycle 1.

Referring to FIG. 1, the motorcycle 1 can include a head pipe 2 in a front of the body. A handle 11 can be attached at an upper part of the head pipe 2 so that the handle 11 can rotate in a substantially horizontal direction. A race number plate 12 that covers a front of the head pipe 2 can be attached in front of the head pipe 2. A pair of front forks 13 can be provided under the head pipe 2.

An axle 14 can be fixed at a lower end of the pair of front forks 13. A front wheel 15 can be rotatably provided at the axle 14. A front fender 16 that covers an upper part of the front wheel 15 can be provided above the front wheel 15.

A connecting frame 2a can be connected to the head pipe 2. The connecting frame 2a can be formed to extend backward and downward from the head pipe 2. The connecting frame 2a can be connected with a main frame 3. The main frame 3 can include a left main frame 3a shown in FIG. 1 and a right main frame 3b shown in FIG. 2. The left and right main frames 3a and 3b can extend backward and downward in a curve.

As shown in FIG. 1, a tank frame 4 can be provided between the main frame 3 and the head pipe 2. As shown in FIG. 2, the tank frame 4 can include left and right tank frames 4a and 4b.

Referring back to FIG. 1, an air cleaner 29 can be provided on the tank frame 4. A fuel tank 30 formed, e.g., from resin, can be provided to extend behind the air cleaner 29 at a back side of the air cleaner 29. A front part of a seat 31 can be provided on the fuel tank 30. The seat 31 can be formed to extend behind the fuel tank 30. An engine 17 can be provided under the main frame 3.

The main frame 3 can be provided with a pivot axle 22. A rear arm 23 can be supported at the pivot axle 22. The rear arm 23 can be supported so that it can rotate in an approximately vertical direction around the pivot axle 22. The rear arm 23 can include a left arm 23a and a right arm that is not shown. A rear wheel 25 can be rotatably attached at a rear end of the rear arm 23.

A driven sprocket 25a that rotates together with the rear wheel 25 can be provided at the rear wheel 25. A chain 26 can be wound around the driven sprocket 25a, and the chain 26 can be driven by the engine 17. The driven sprocket 25a and the chain 26 can be provided on the left side, with respect to a widthwise direction of the motorcycle. A rear fender 27 to cover an upper part of the rear wheel 25 can be provided above the rear wheel 25.

As shown in FIG. 1, the tank frame pair 4 including the left and right tank frames 4a and 4b can support a front part of the fuel tank 30.

As shown in FIG. 2, the air cleaner 29 can be provided between the left and right tank frames 4a and 4b. Upper parts of the left and right main frames 3a and 3b can be coupled by a connection member 5. The connection member 5 can be provided with a support member 6 that projects backward.

Figure 3:
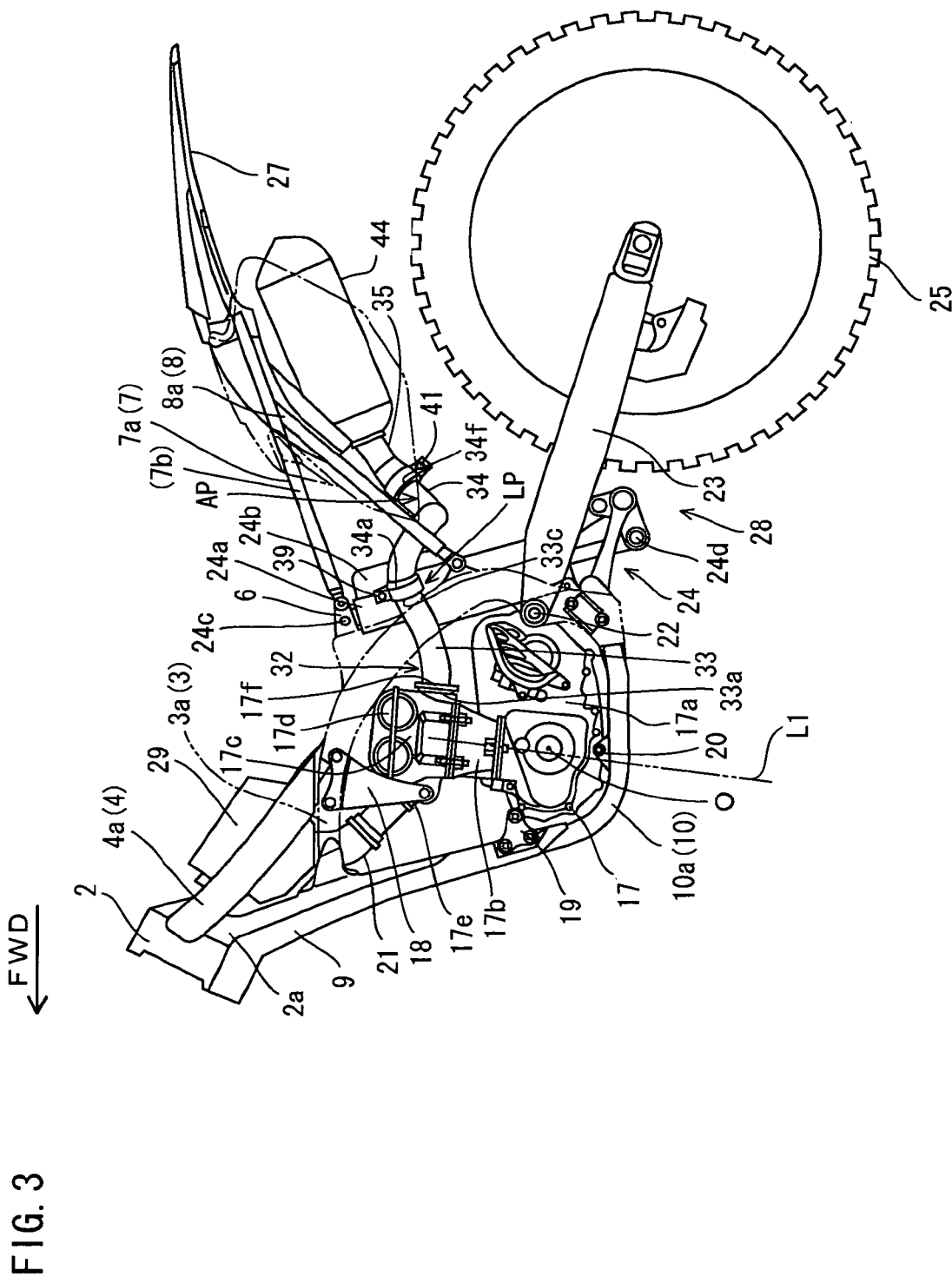
FIG. 3 is a left side view of an exhaust pipe and peripheral structure thereof in the motorcycle according to the first embodiment.

FIG. 3 is a left side view of the motorcycle 1 showing a peripheral structure of an exhaust pipe 32. As shown in FIG. 3, the support member 6 can be attached to the connection member 5, and protrude backward and upward. The support member 6 can be connected with left and right seat frames 7a and 7b that extend backward and upward. The support member 6 can be also connected with a rear cushioning member 24 (e.g., a shock absorber).

As shown in FIG. 2, a connection member 7c that connects the left and right seat frames 7a and 7b can be provided between the left and right seat frames 7a and 7b. The left and right seat frames 7a and 7b and the connection member 7c can form a seat frame 7. As shown in FIG. 1, a back stay 8 can be attached between the main frame 3 and the seat frame 7.

As shown in FIG. 1, a left stay 8a can be provided between the left main frame 3a and the left seat frame 7a. As shown in FIG. 2, a right stay 8b can be provided between the right main frame 3b and the right seat frame 7b. The left and right stays 8a and 8b can form a back stay 8.

As shown in FIG. 3, a down frame 9 that extends backward and downward can be connected to a lower side of the head pipe 2. A lower left frame 10a and a lower right frame that is not shown can be connected to a lower end of the down frame 9. The lower left frame 10a and the lower right frame can be arranged to extend backward and connected to lower ends of the left and right main frames 3a and 3b. The lower left frame 10a and the lower right frame can form a lower frame 10.

The engine 17 can be provided under the main frame 3 and behind the down frame 9. The engine 17 according to the present embodiment can be a single-cylinder engine (e.g., an engine having one cylinder). The engine 17 can be fixed by a support plate 18 fixed to the main frame 3, a support plate 19 fixed to the down frame 9 and a support plate 20 fixed to the lower frame 10. In the engine 17, a cylinder axial line L1 can be inclined backward with respect to an approximately or substantially vertical line. The cylinder axial line L1 can be inclined backward by some angles (such as 5 degrees) with respect to an approximately or substantially vertical line.

The engine 17 can include a crankcase 17a that stores a rotating crankshaft (not shown), a cylinder part 17b, a cylinder head 17c provided on the cylinder part 17b and a cylinder head cover 17d. The cylinder part 17b of the engine 17 can include one cylinder (not shown).

The cylinder head 17c of the engine 17 can include an intake port 17e at a front side of the cylinder head 17c. An exhaust port 17f can be formed at a back side of the cylinder head 17c. More specifically, the engine 17 can be a front-intake rear-exhaust type single-cylinder engine. The intake port 17e can be connected with an intake pipe 21 that extends forward and upward.

The rear cushioning member 24 can be provided behind the main frame 3 and in front of the rear wheel 25. The rear cushioning member 24 can be inclined forward. The rear cushioning member 24 can include a main body 24a and a sub-tank 24b connected to the main body 24a. The main body 24a can be compressed and expanded in an approximately vertical direction so that it can absorb impact given when the rear wheel 25 moves in an approximately vertical direction. An upper end of the main body 24a can be provided with an upper attachment part 24c. The upper attachment part 24c can be attached to the support member 6. The main body 24a can be attached to the support member 6 so that the main body 24a can rotate in an approximately vertical direction.

A lower part of the main body 24a can be coupled to the rear arm 23 through a link mechanism 28. An attachment part 24d can be provided under the main body 24a. The attachment part 24d can be attached to the link mechanism 28 through a connection member. In this way, impact given when the rear arm 23 and the rear wheel 25 move in an approximately vertical direction can be absorbed.

As shown in FIG. 2, a cam chain chamber 17g can be provided at a left side surface (a side indicated by an arrow Y1) of the cylinder part 17b and the cylinder head 17c of the engine 17 so that the chamber laterally expands. The cam chain chamber 17g can store a cam chain used to drive a cam that controls opening/closing of an intake valve and an exhaust valve that are not shown.

As shown in FIG. 2, the sub-tank 24b of the rear cushioning member 24 can be provided on a right side of the rear cushioning member 24 (a side indicated by an arrow Y2). A front pipe 33, forming a first or forward portion of the exhaust pipe 32, can be provided on a left side of the rear cushioning member 24 (the side indicated by the arrow Y1). As shown in FIG. 3, an axial center of the sub-tank 24b can be arranged along a lengthwise direction of the main body 24a of the rear cushioning member 24. More specifically, an axial center of the sub-tank 24b of the rear cushioning member 24 can be arranged to be substantially parallel to an axial center of the main body 24a of the rear cushioning member 24.

Figure 4:
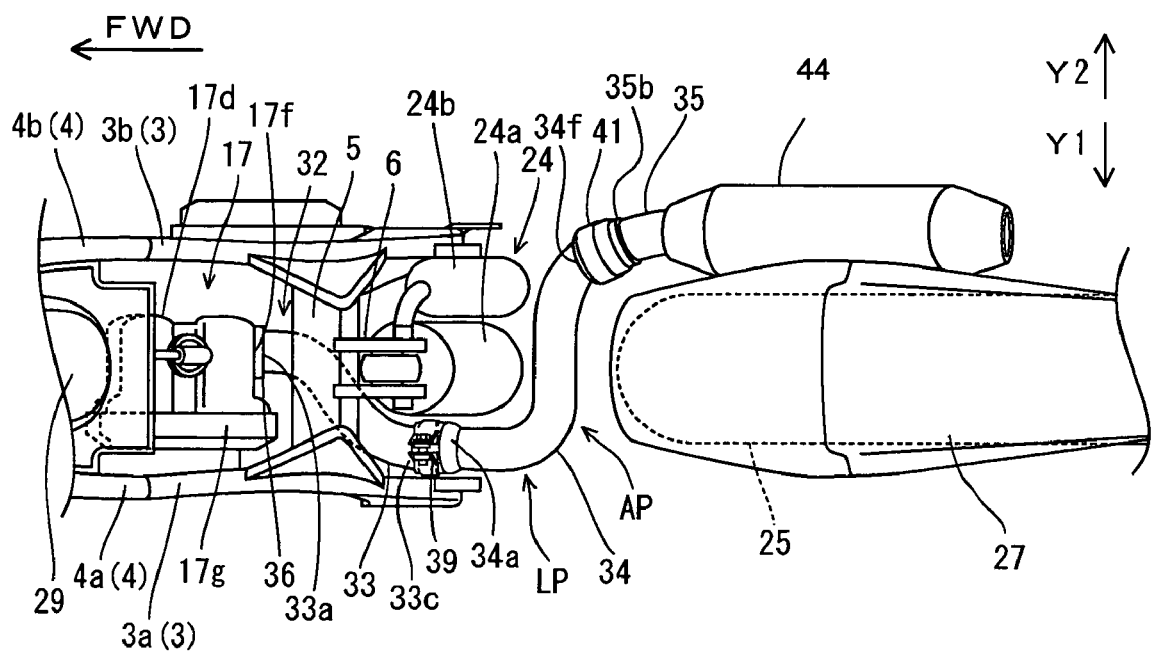
FIG. 4 is a plan view of an exhaust pipe and peripheral structure thereof in the motorcycle according to the first embodiment.
Figure 5:
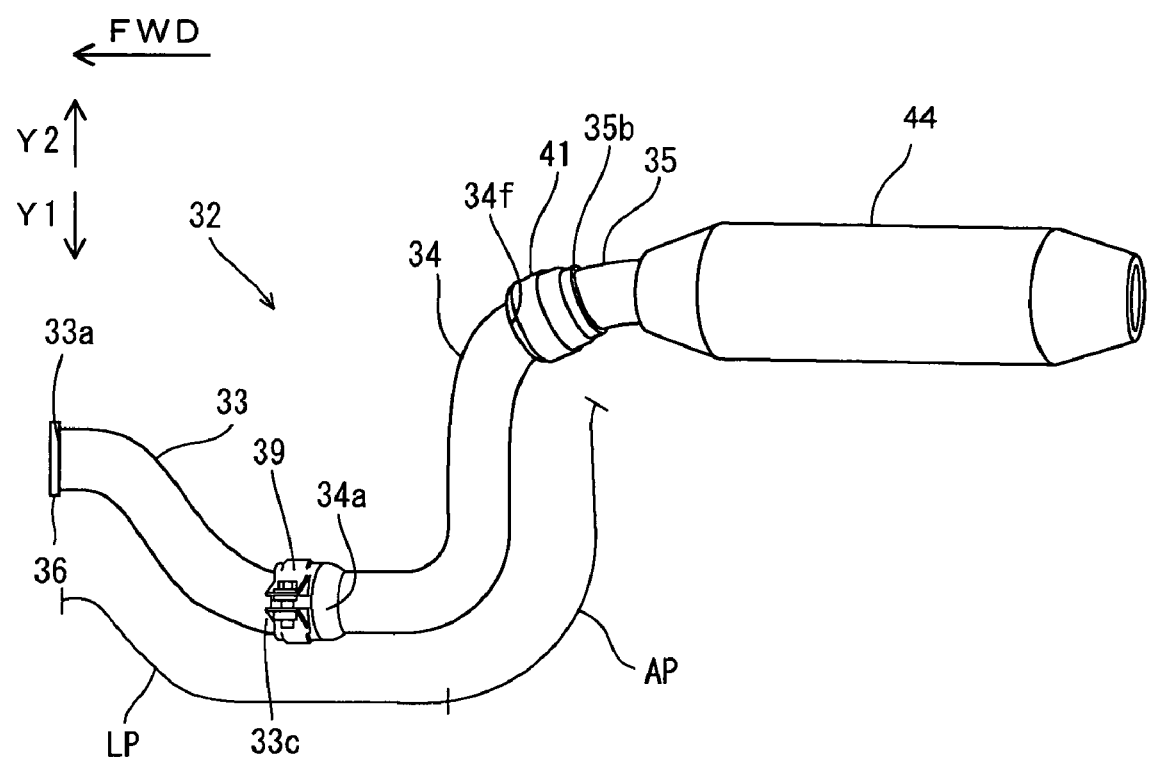
FIG. 5 is a plan view of the exhaust pipe and a muffler according to the first embodiment.

FIG. 4 is a plan view of the exhaust pipe 32 and peripheral structure thereof. FIG. 5 is a plan view of the exhaust pipe 32 and a muffler (also, "silencer") 44. As shown in FIG. 4, the exhaust pipe 32 can be connected to a back side of the engine 17, to discharge exhaust gas from the engine 17. As shown in FIG. 5, the exhaust pipe 32 can include the front pipe 33, an intermediate pipe 34 forming a second or substantially transverse portion, and a rear pipe 35 forming a third or exhaust portion.

As shown in FIG. 4, a front end portion 33a of the front pipe 33 can be connected with the back side of the engine 17. The front pipe 33 can be curved to the left (to a direction indicated by the arrow Y1) and then extend backward (opposite to a direction indicated by the arrow FWD) on the left side of the rear cushioning member 24 (on the side indicated by the arrow Y1). A rear end portion 33c of the front pipe 33 can be connected to the intermediate pipe 34.

A front end portion 34a of the intermediate pipe 34 can be connected to the front pipe 33. The intermediate pipe 34 can extend from the left side (the side indicated by the arrow Y1) to the right side (the side indicated by the arrow Y2) in the widthwise direction of the motorcycle 1 between the rear cushioning member 24 and the rear wheel 25. Thus, the intermediate pipe 34 can extend substantially transversely to a lengthwise direction of the motorcycle 1 from one side to the other side. A rear end portion 34f of the intermediate pipe 34 can be connected to the rear pipe 35.

A front end portion 35b of the rear pipe 35 can be connected to the intermediate pipe 34. The rear pipe 35 can extend backward on the right side, with respect to the widthwise direction, along the motorcycle body. A rear end portion of the rear pipe 35 can be connected with the muffler 44.

As shown in FIG. 3, the muffler 44 can be connected to the rear pipe 35 above the exhaust port 17f.

Figure 6:
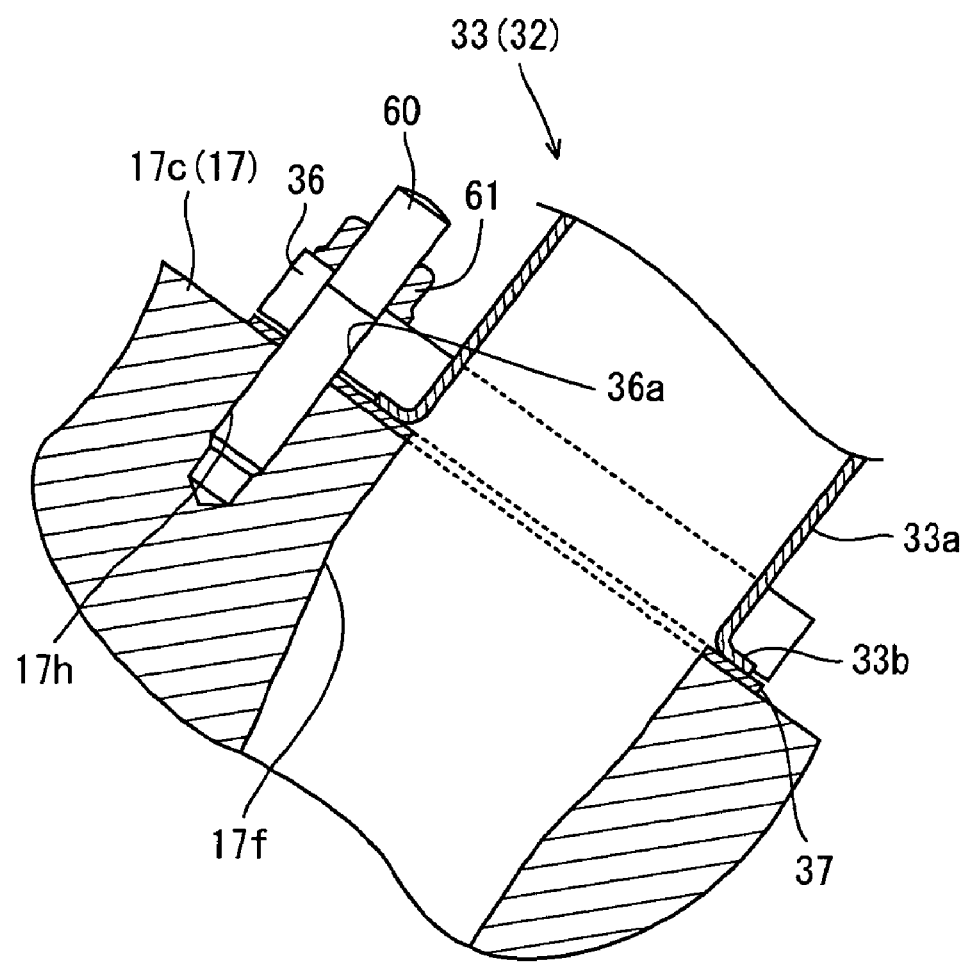
FIG. 6 is a sectional view showing how an engine and the exhaust pipe can be connected.

FIG. 6 is a sectional view of a connection part between the front pipe 33 and the engine 17. As shown in FIG. 6, the front pipe 33 of the exhaust pipe 32 can be connected to the cylinder head 17c through a flange 36. The flange 36 can be attached to an outer circumference of the front pipe 33. The flange 36 and the cylinder head 17c can include openings such as screw holes 36a and 17h, respectively. After the screw hole 36a and the screw hole 17h are registered or aligned, a fastener or fixing member, such as a bolt 60, can be inserted through the screw hole 36a and screw hole 17h and fastened to the cylinder head 17c, e.g., with a fastening or tensioning or securing member, such as a nut 61, so that the front pipe 33 can be fixed to the cylinder head 17c.

Figure 7:
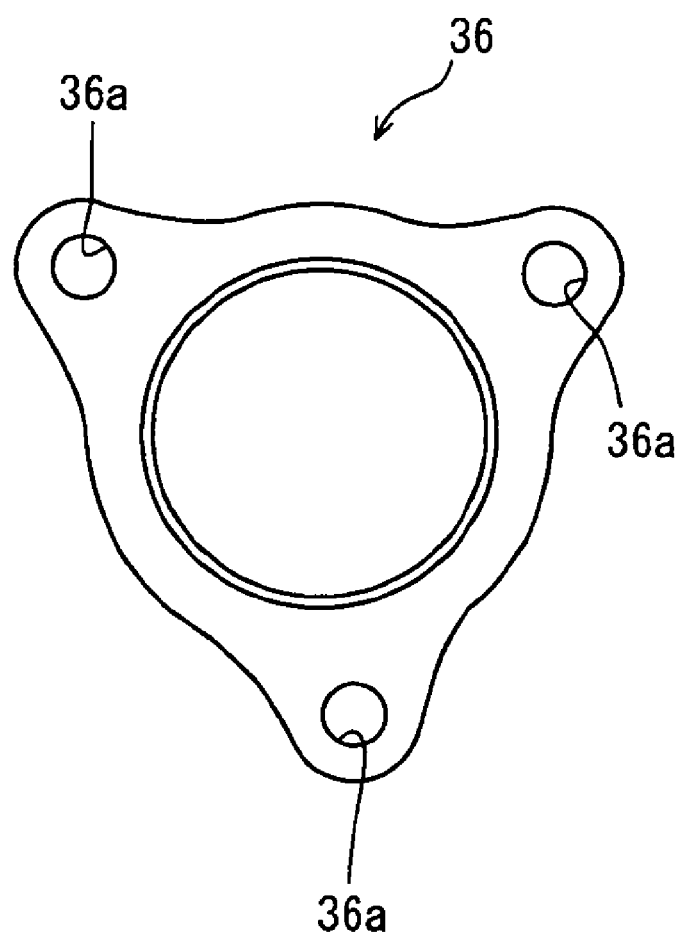
FIG. 7 is a front view of a flange attached to an outer circumference of a front pipe, according to the first embodiment.

FIG. 7 is a front view of the flange 36. As shown in FIG. 7, the flange 36 can have multiple openings, such as three screw holes 36a. As described above, a bolt 60 can be inserted through each of the three screw holes 36a, so that the front pipe 33 can be fixed to the cylinder head 17c.

As shown in FIG. 6, a gasket 37 can be provided between the flange 36 and the cylinder head 17c so that an air-tight connection is made between the engine 17 and the exhaust pipe 32. The front end portion 33a of the front pipe 33 can have an outwardly bent shape, e.g. by flaring outward to form a lip, and a lip or bent part 33b of the front end portion 33a can be in contact with the gasket 37.

As shown in FIG. 2, the front pipe 33 can extend to the left side of the rear cushioning member 24 (the side indicated by the arrow Y1) from the front end portion 33a. The rear end portion 33c of the front pipe 33 can be positioned further to the left (i.e., to the side indicated by the arrow Y1) than the rear cushioning member 24, and further to the right (i.e., to the side indicated by the arrow Y2) than the left stay 8a.

Figure 8:
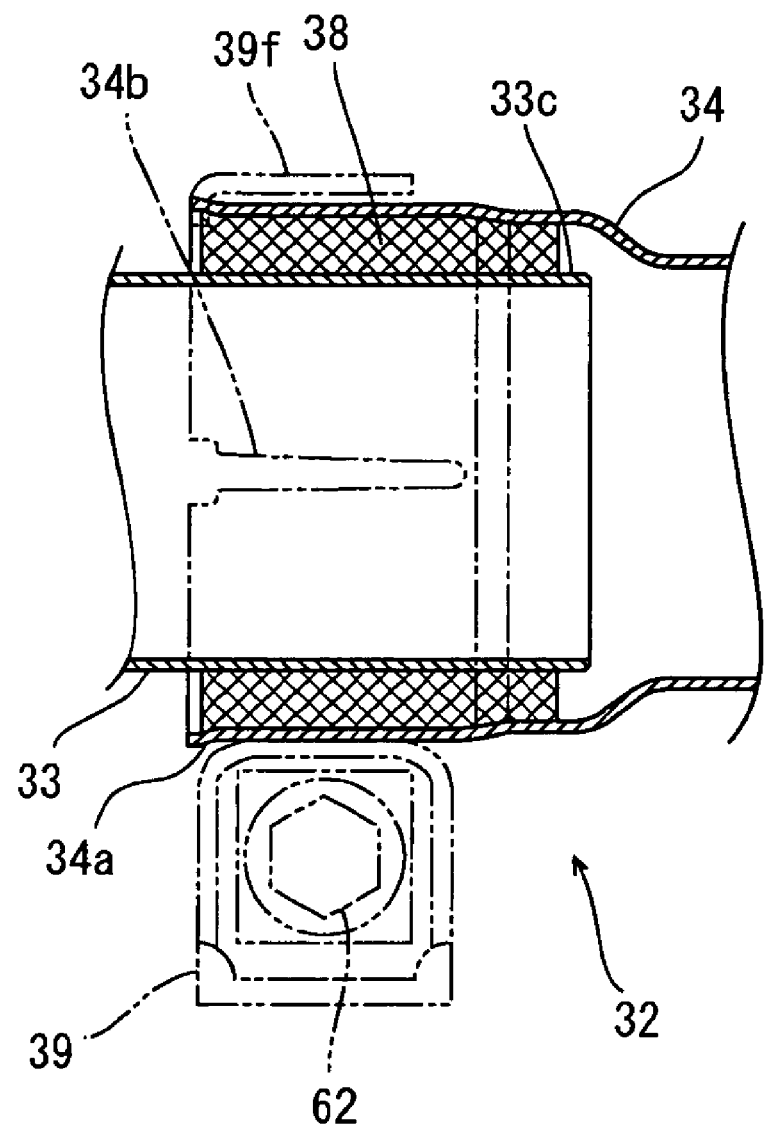
FIG. 8 is a sectional view showing how the front pipe and an intermediate pipe can be connected.

FIG. 8 is a sectional view of a connection part between the front pipe 33 and the intermediate pipe 34. As shown in FIG. 8, the front pipe 33 and the intermediate pipe 34 can be fixed by a connection member 39. The rear end portion 33c of the front pipe 33 and a gasket 38 can be inserted in the front end portion 34a of the intermediate pipe 34.

Figure 9:
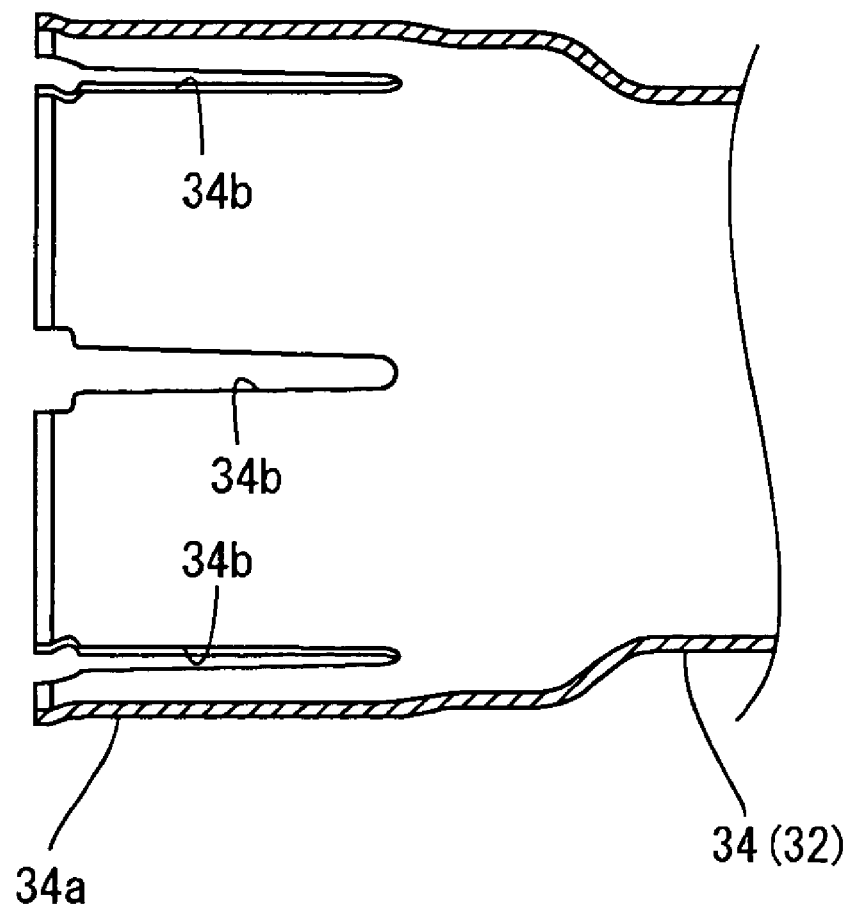
FIG. 9 is a sectional view of a front end of the intermediate pipe.

FIG. 9 is a sectional view of the front end portion 34a of the intermediate pipe 34. As shown in FIG. 9, the front end portion 34a of the intermediate pipe 34 can have a larger diameter than another part of the intermediate pipe 34. Multiple notches or slits, such as six slits 34b, can be formed at intervals, e.g., equally spaced intervals, about the front end portion 34a. The six slits 34b can be formed along a lengthwise direction of the intermediate pipe 34.

Figure 10:
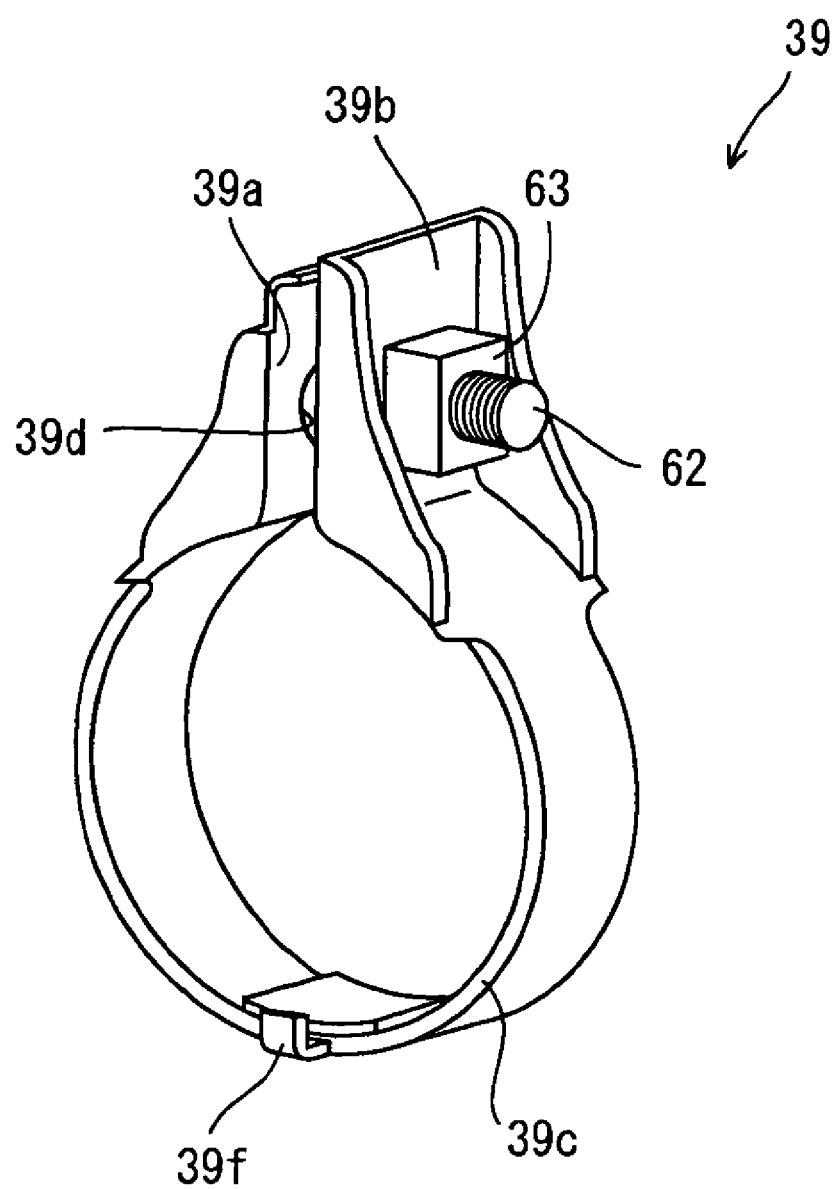
FIG. 10 is a perspective view of a connection member that can be used to connect the front pipe and the intermediate pipe.
Figure 11:
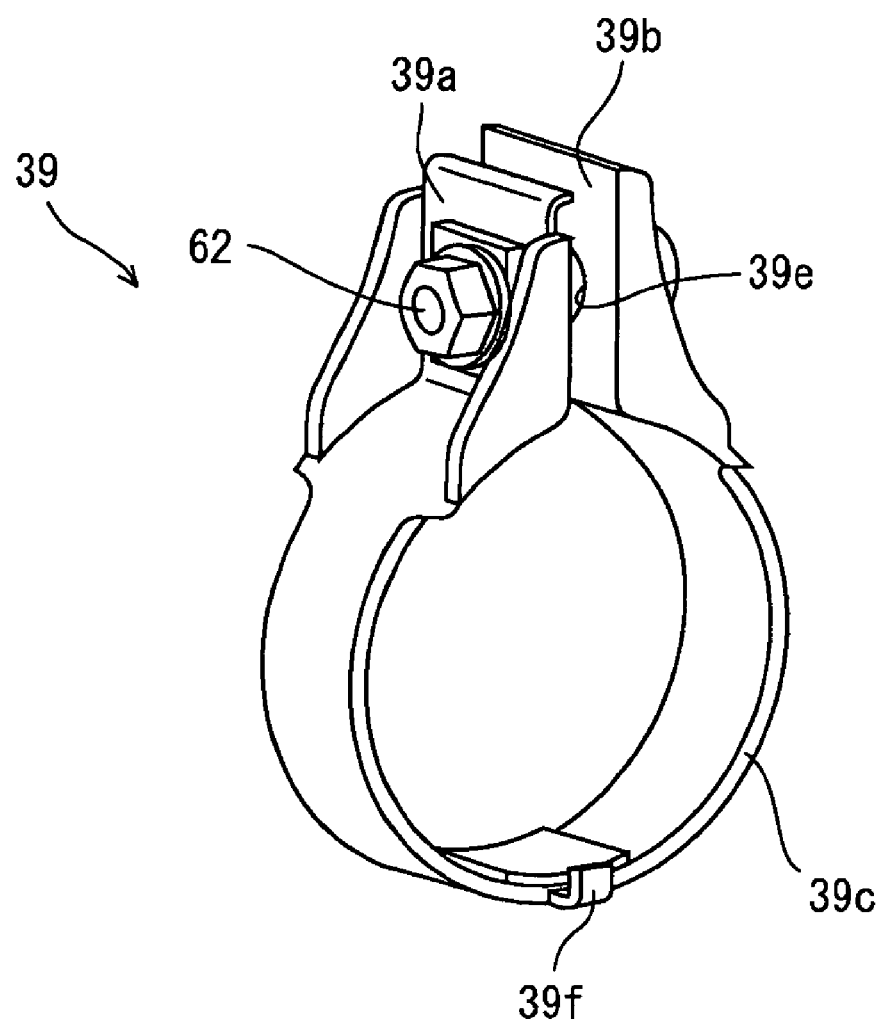
FIG. 11 is a perspective view of the connection member.

FIGS. 10 and 11 are perspective views of a connection member 39. As shown in FIGS. 10 and 11, the connection member 39 can include coupling parts 39a and 39b and an annular part 39c. The coupling parts 39a and 39b can include openings, such as screw holes 39d and 39e, respectively. A fastener or fixing member, such as a bolt 62, can be inserted into the screw holes 39d and 39e, and a fastening or tensioning or securing member, such as a nut 63, can be applied to the bolt 62. By tightening the nut 63 about the bolt 62, ends of the connection member 39 can be drawn together, so that the width of each of the slits 34b of the front end portion 34a is reduced, and the front pipe 33 and the intermediate pipe 34 can be connected as shown in FIG. 8. The annular part 39c can include a claw 39f.

As shown in FIG. 5, the front pipe 33 and the intermediate pipe 34 can be divided into a left side section LP and an across section AP. The left side section LP can include the front pipe 33 and an upstream part of the intermediate pipe 34. The across section AP can include a downstream part of the intermediate pipe 34.

The left side section LP can be curved to the left (to the side indicated by the arrow Y1) from the front end portion 33a, and then extend backward on the left side of the rear cushioning member 24 (see FIG. 2). The across section AP can extend behind the rear cushioning member 24 and in front of the rear wheel 25 from the left side (the side indicated by the arrow Y1) to the right side (the side indicated by the arrow Y2) in the widthwise direction of the motorcycle.

As shown in FIG. 4, a connection part between the front pipe 32 and intermediate pipe 33 can be positioned on the left side of the rear cushioning member 24. As shown in FIG. 3, a downstream side of the left side section LP can be curved backward and downward when viewed from the left side.

As shown in FIG. 4, an upstream side of the across section AP can be positioned farther to the left (to the side indicated by the arrow Y1) than the rear cushioning member 24. A downstream side of the across section AP can extend farther to the right (to the side indicated by the arrow Y2) than the position of the sub-tank 24b of the rear cushioning member 24.

As shown in FIG. 3, the rear end portion of the rear pipe 35 can be connected with the muffler 44. The downstream side of the intermediate pipe 34 and the rear pipe 35 can extend upward. In this way, the muffler 44 can be positioned above the exhaust port 17f.

Figure 12:
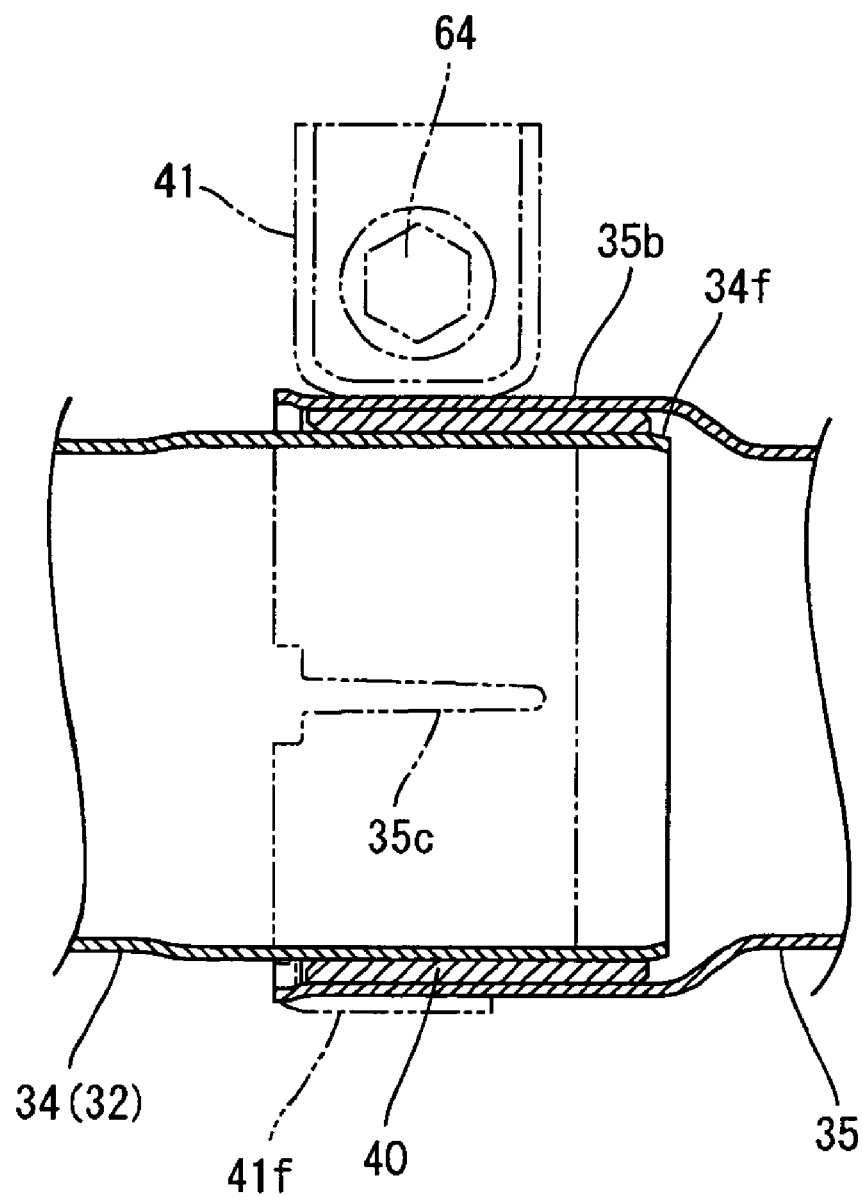
FIG. 12 is a sectional view showing how the intermediate pipe and a rear pipe can be connected.

FIG. 12 is a sectional view of a connection part between the intermediate pipe 34 and the rear pipe 35. As shown in FIG. 12, the intermediate pipe 34 and the rear pipe 35 can be fixed by a connection member 41. The rear end portion 34f of the intermediate pipe 34 and a gasket 40 can be inserted in the front end portion 35b of the rear pipe 35.

Figure 13:
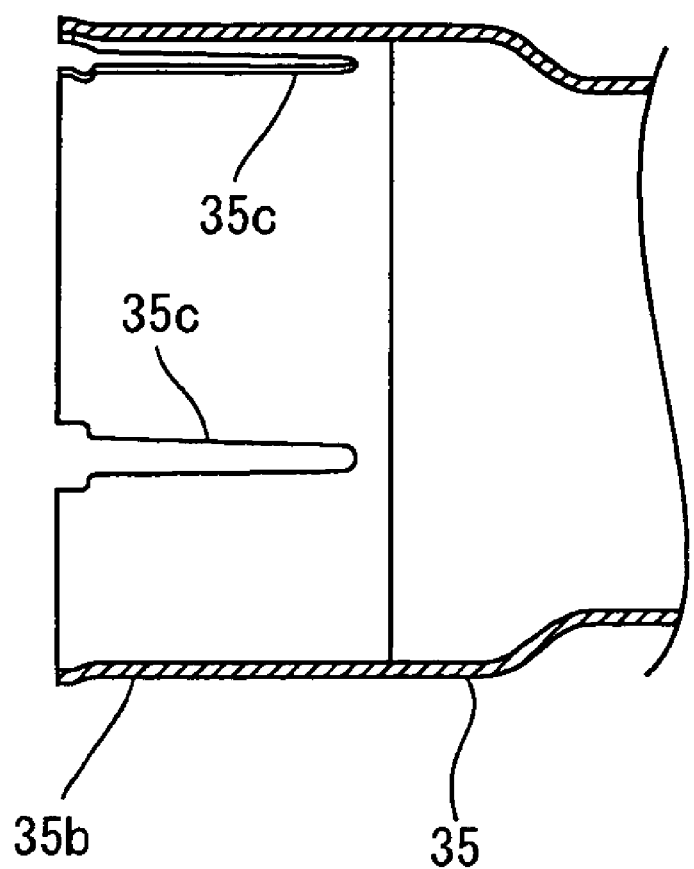
FIG. 13 is a sectional view of a front end of the rear pipe.

FIG. 13 is a sectional view of the front end portion 35b of the front pipe 35. As shown in FIG. 13, the front end portion 35b of the rear pipe 35 can have a larger diameter than another part of the rear pipe 35. Multiple notches or slits, e.g., four slits 35c, can be formed at intervals, e.g., equally spaced intervals, in the front end portion 35b. The four slits 35c can be formed along a lengthwise direction of the rear pipe 35.

Figure 14:
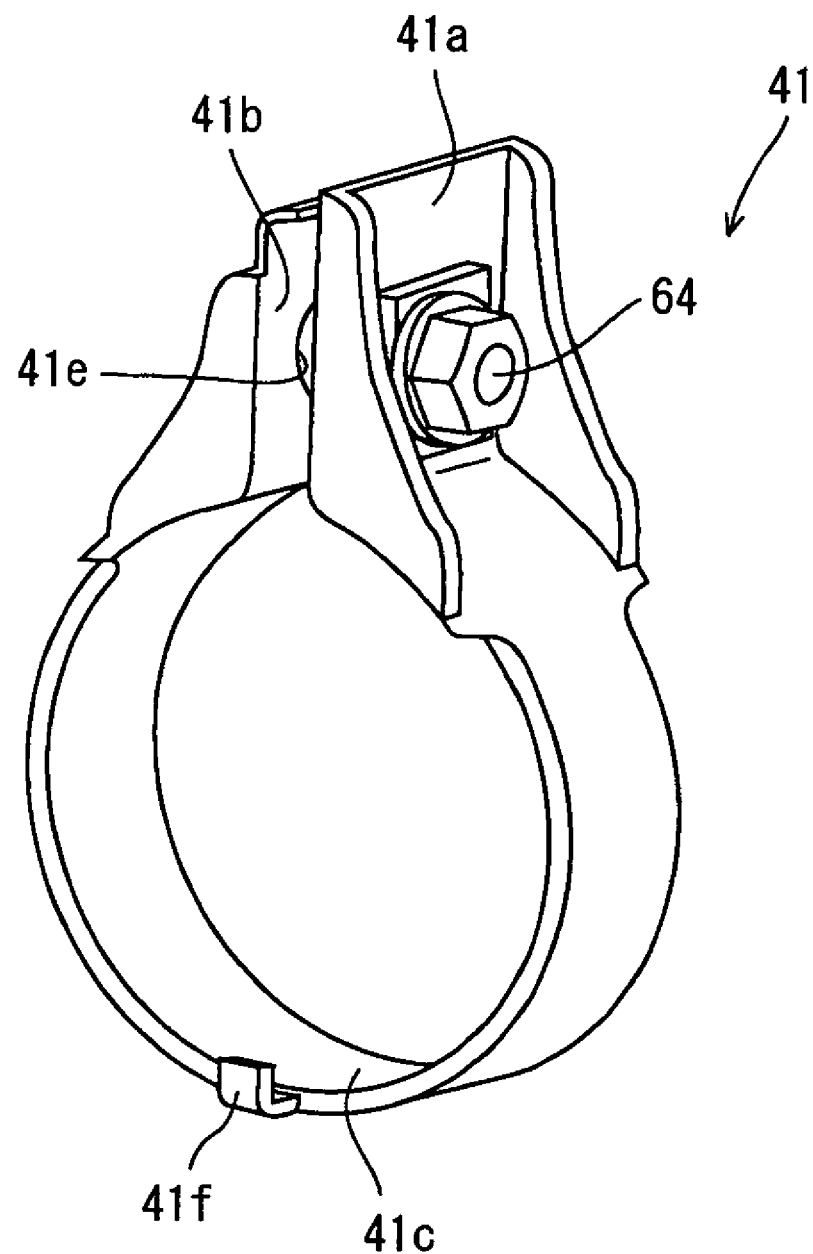
FIG. 14 is a perspective view of a connection member that can be used to connect the intermediate pipe and the rear pipe.
Figure 15:
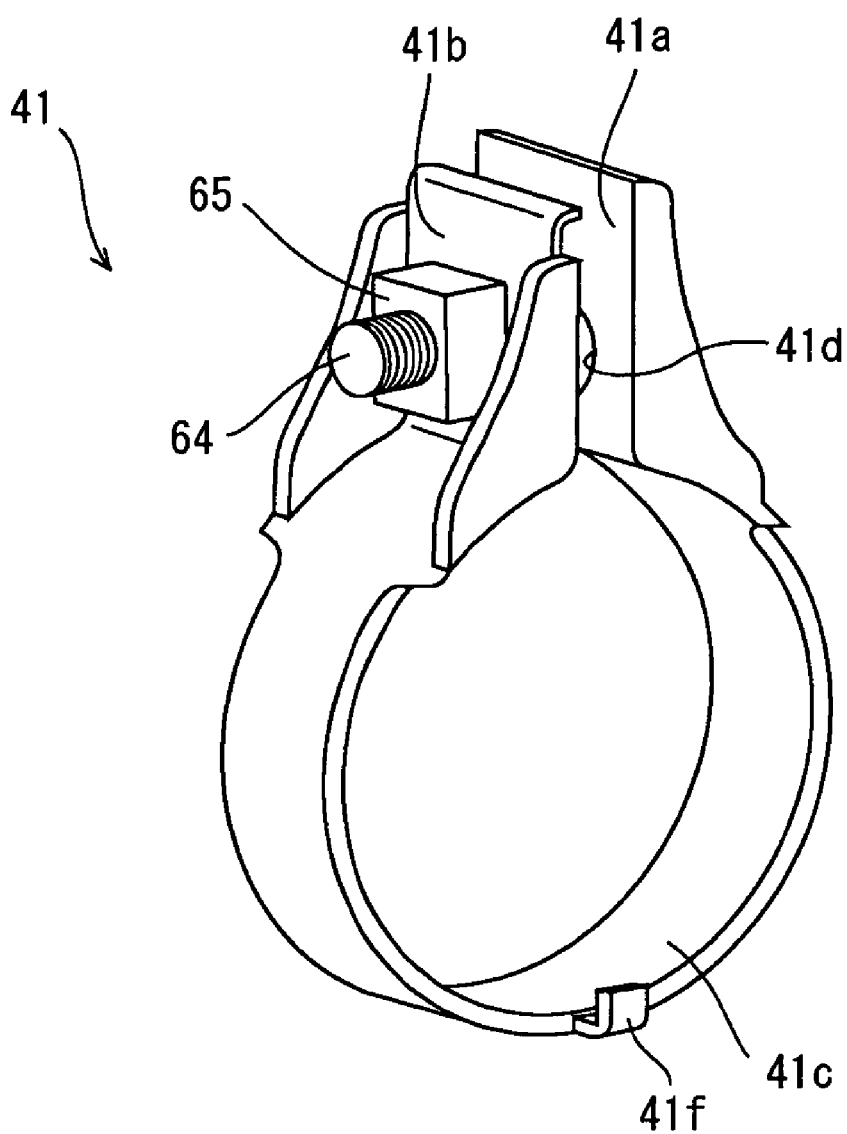
FIG. 15 is a perspective view of the connection member that can be used to connect the intermediate pipe and the rear pipe.

FIGS. 14 and 15 are perspective views of the connection member 41. As shown in FIGS. 14 and 15, the connection member 41 can include coupling parts 41a and 41b and an annular part 41c. The coupling parts 41a and 41b can include openings, such as screw holes 41d and 41e, respectively. A fastener or fixing member, such as a bolt 64, can be inserted into the screw holes 41d and 41e, and a fastener or tensioning or securing member, such as a nut 65, can be applied to the bolt 64. By tightening the nut 65 about the bolt 64, ends of the connection member 41 can be drawn together, so that the width of each of the slits 35c of the front end portion 35b is reduced, and the intermediate pipe 34 and the rear pipe 35 can be connected as shown in FIG. 12. The annular part 41c can include a claw 41f.

The above-described first embodiment has a number of advantages. For example, the length of the exhaust pipe 32 can be increased, even though the exhaust pipe 32 is connected to the back side of the engine 17. This increase in length is due at least to the length of the part extending on the left side of the rear cushioning member 24 from the engine 17 (the first or forward portion 33, and the length of the part extending in the widthwise direction of the motorcycle between the rear cushioning member 24 and the rear wheel 25 (the second or transverse portion 34), both of which add to the overall length of the exhaust pipe 32.

Moreover, as described above, the cylinder axis L1 of the engine 17 can be inclined backward, creating space for the air cleaner 29 in front of the engine 17. Additionally, space is created for the exhaust pipe 32 behind the engine 17. Further, because the engine 17 can be inclined backward, weight balance of the motorcycle body can be improved, and the space formed behind the engine can be effectively used to allow the exhaust pipe 32 to have a sufficient length.

In the first embodiment, the length of the exhaust pipe can also be increased by forming the downstream side of the intermediate pipe 34 and the rear pipe 35 to extend backward and upward, as described.

The first embodiment can also permit greater ease of assembly, for at least the reason that, as described above, the front pipe 33 and the intermediate pipe 34 can be connected through the connection member on the left side of the rear cushioning member 24. More specifically, the left side section LP can be connected through the connection member on the left side of the rear cushioning member 24. Thus, when the exhaust pipe 32 and the rear cushioning member 24 are assembled, the assembling operation can be carried out in the following order: the front pipe 33, the rear cushioning member 24, and the intermediate pipe 34. This yields improved assembling operability, in contrast to structures in which the front pipe 33 and the intermediate pipe 34 are integrally formed.

Other advantages include maintaining a desired minimum ground clearance of the motorcycle 1, because the exhaust pipe 32 can be formed to extend backward and upward from the engine 17. In addition, the muffler 44 can be provided above the exhaust port 17f, so that the angle (banking angle) at which the motorcycle 1 can be inclined to the right can be maintained at a desired level.

Still further advantages are provided by arranging an axial center of the sub-tank 24b of the rear cushioning member 24 to be substantially parallel to an axial center of the main body 24a of the rear cushioning member 24, as described. This arrangement, for example, enables effective use of space on the right side of the rear cushioning member 24.

SECOND EMBODIMENT

Referring to FIGS. 16 to 20, a second embodiment of the present invention will be described. The second embodiment is different from the first embodiment in that an intermediate pipe 134 of an exhaust pipe 132 can be formed in an approximately spiral shape between a rear cushioning member 124 (e.g., a shock absorber) and the rear wheel 25. In the second embodiment, portions that are the same as those of the first embodiment are denoted by the same reference numbers, and their description will not be repeated in detail.

Figure 16:
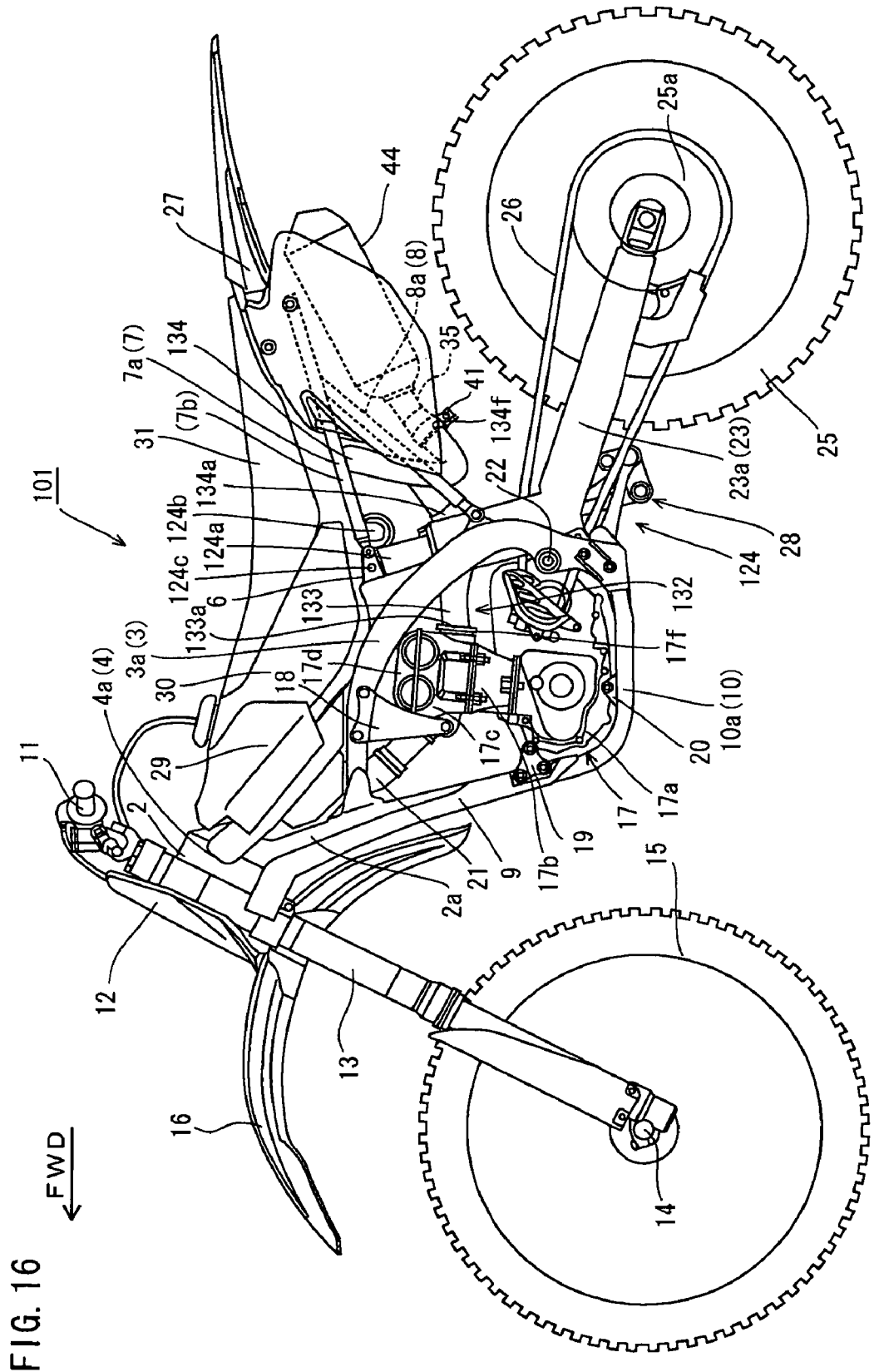
FIG. 16 is a left side view of a motorcycle according to a second embodiment of the present invention.

FIG. 16 is a left side view of a motorcycle 101 according to the second embodiment. As shown in FIG. 16, the motorcycle 101 can include an exhaust pipe 132 connected to the back side of the engine 17. The exhaust pipe 132 can include a front pipe 133, forming a first or forward portion, and the intermediate pipe 134.

A front end portion 133a of the front pipe 133 can be connected to the cylinder head 17c of the engine 17. A front end portion 134a of the intermediate pipe 134 can be connected to a downstream side of the front pipe 133. A rear pipe 35, forming a third portion, can be connected to a downstream side of the intermediate pipe 134. A rear end portion 134f of the intermediate pipe 134 can be connected to the rear pipe 35.

The muffler 44 can be connected to a downstream side of the rear pipe 35. The front pipe 133 and the intermediate pipe 134 can be connected through a connection member.

Figure 17:
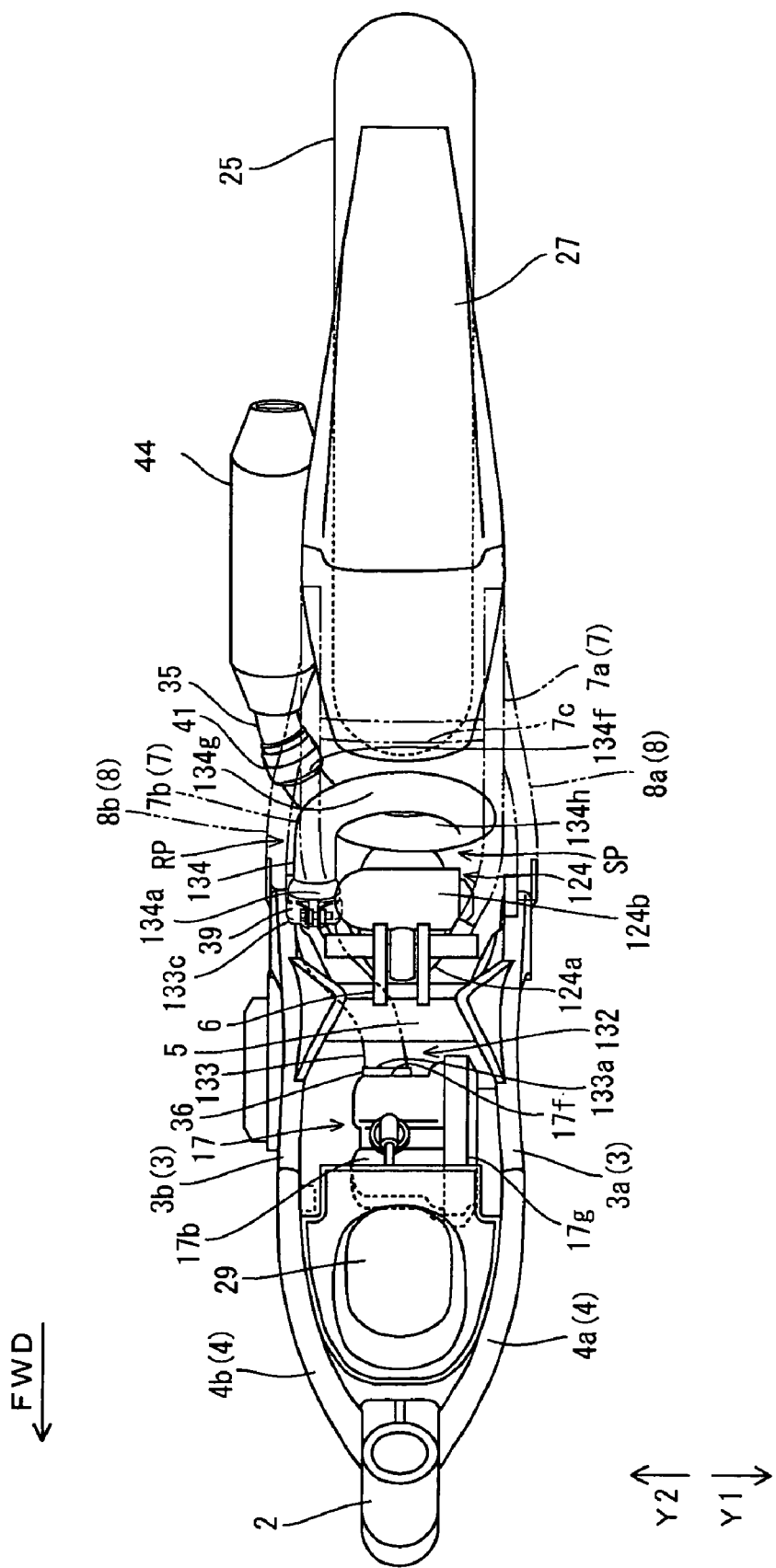
FIG. 17 is a plan view of the motorcycle according to the second embodiment.

FIG. 17 is a plan view of the motorcycle 101. As shown in FIG. 17, the front pipe 133 can extend backward as it curves to the right (to the direction indicated by the arrow Y2) from the front end portion 133a connected to the back side of the engine 17. A rear end portion 133c of the front pipe 133 connected to the intermediate pipe 134 can be provided farther to the right (to the side indicated by the arrow Y2) than the rear cushioning member 124 and farther to the left (to the side indicated by the arrow Y1) than the right stay 8b.

The intermediate pipe 134 can include a right side part RP that extends along the right side of the rear cushioning member 124 (on the side indicated by the arrow Y2) and a spiral-shaped part SP positioned between the rear cushioning member 124 and the rear wheel 25. The right side part RP can include the front pipe 133 and an upstream part of the intermediate pipe 134. The spiral-shaped part SP can include a downstream part of the intermediate pipe 134.

Figure 18:
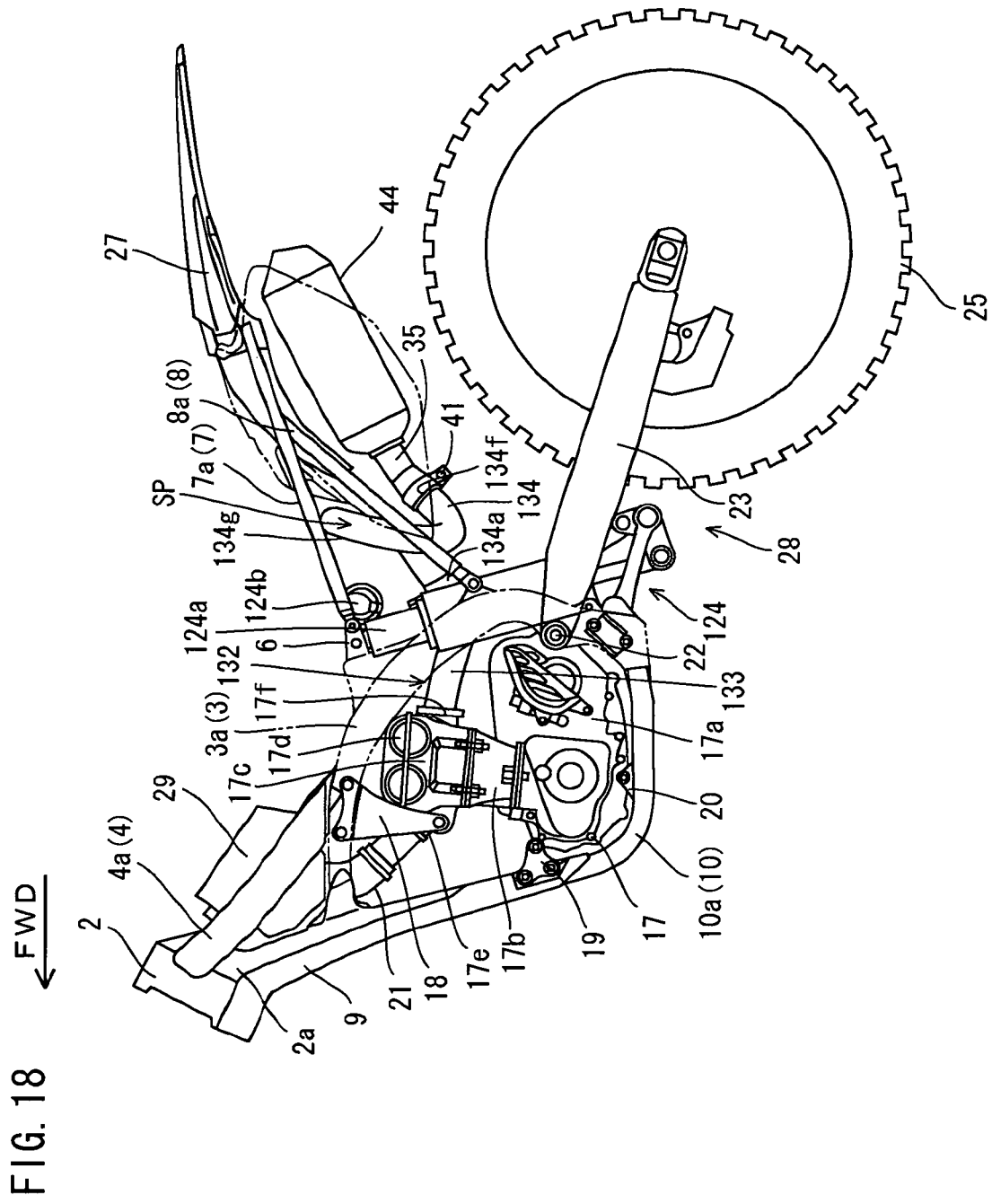
FIG. 18 is a left side view of the motorcycle according to the second embodiment.

FIG. 18 is a left side view of the motorcycle 101 showing a peripheral structure of the exhaust pipe 132. As shown in FIGS. 17 and 18, the spiral-shaped part SP can extend in an approximately spiral manner around an axis in a lengthwise (e.g., front-to-back) direction of the motorcycle body. For example, the spiral-shaped part SP can include at least one loop having an axis substantially aligned with a lengthwise direction of the motorcycle 101. Moreover, the loop can be substantially transverse to the lengthwise direction of the motorcycle 101.

Figure 19:
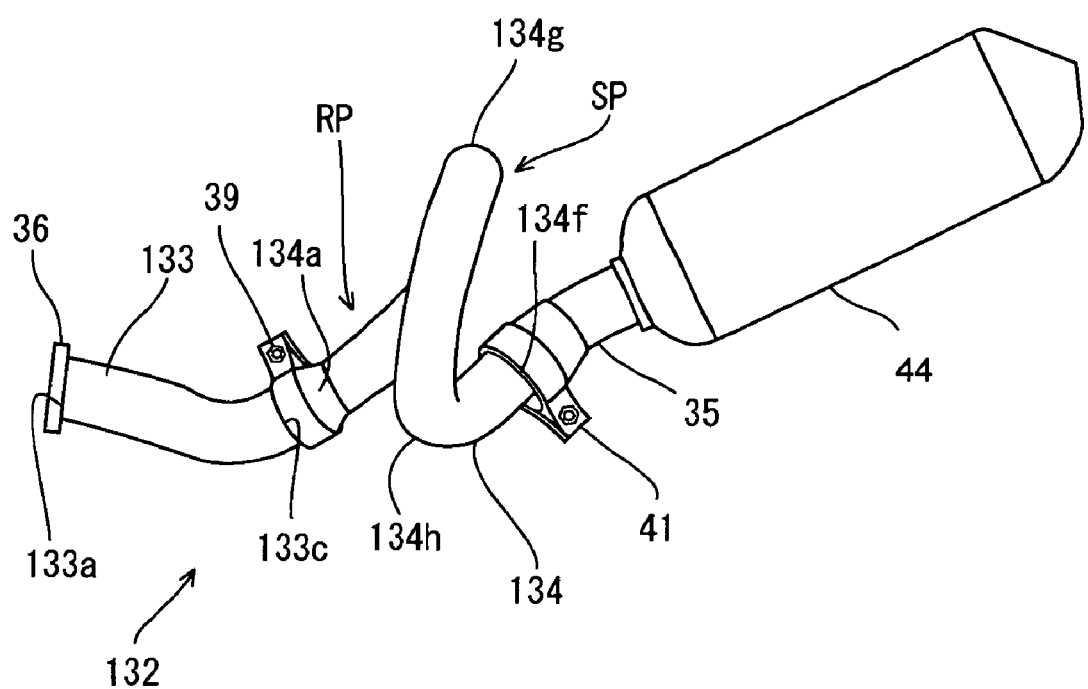
FIG. 19 is a left side view of an exhaust pipe and a muffler according to the second embodiment.
Figure 20:
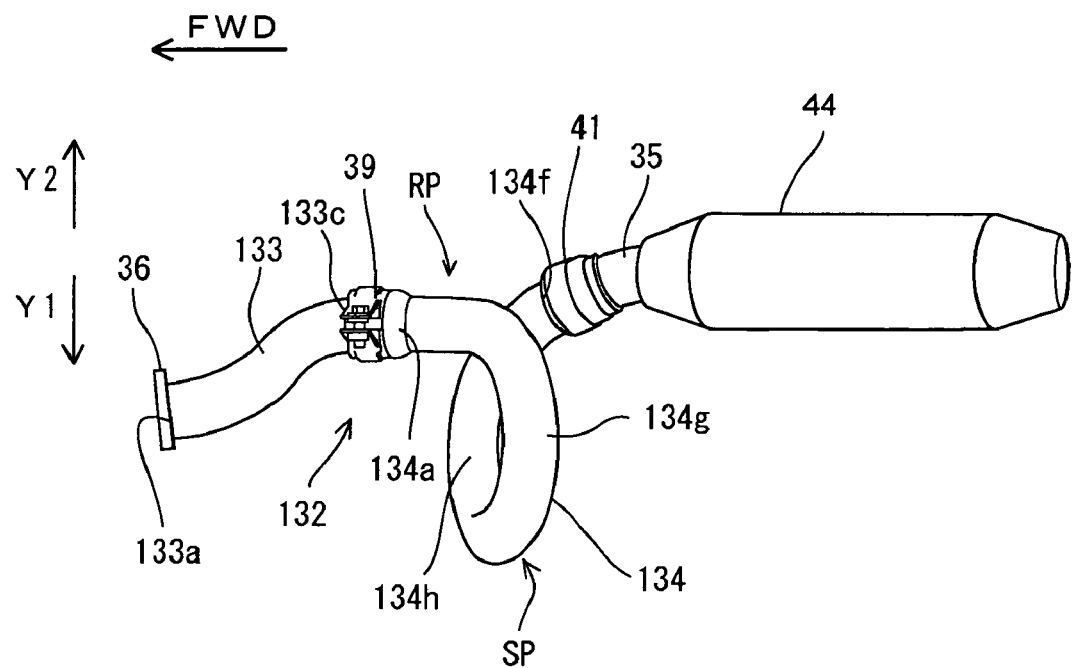
FIG. 20 is a plan view of the exhaust pipe and the muffler according to the second embodiment.

FIG. 19 is a left side view of the exhaust pipe 132 and the muffler 44. FIG. 20 is a plan view of the exhaust pipe 132 and the muffler 44. As shown in FIGS. 19 and 20, the spiral-shaped part SP can extend backward and upward from an upstream side to a downstream side. The spiral-shaped part SP can include a fourth portion or upper crossing part 134g that extends from the right side to the left side substantially or approximately in the widthwise direction of the motorcycle, e.g., substantially transversely to a lengthwise direction of the motorcycle, and a fifth portion or lower crossing part 134h that extends from the left side to the right side substantially or approximately in the widthwise direction of the motorcycle, e.g., substantially transversely to a lengthwise direction of the motorcycle.

As shown in FIG. 17, the rear cushioning member 124 can include a main body 124a and a sub-tank 124b provided near an upper end of the main body 124a. An axial center of the sub-tank 124b can be arranged along an approximately widthwise direction of the body of the motorcycle 101. As shown in FIG. 18, the sub-tank 124b can be provided above the front pipe 133 of the exhaust pipe 132.

Like the first embodiment, the second embodiment provides a number of advantages. For example, a length of the intermediate pipe 134 can be increased due to the spiral-shaped part SP provided in the intermediate pipe 134, in contrast to a case where an exhaust pipe extends linearly between a rear cushioning member and a rear wheel.

Moreover, as described above, the spiral-shaped part SP can include the upper crossing part 134g that extends from the right side to the left side in the widthwise direction of the motorcycle, and the lower crossing part 134h that extends from the left side to the right side in the widthwise direction of the motorcycle. Thus, the length of the exhaust pipe 132 can be even more increased, because the exhaust pipe 132 reciprocates between the rear cushioning member 24 and the rear wheel 25.

Note that according to the second embodiment, the spiral-shaped part SP can rotate about 360 degrees around a lengthwise axis of the motorcycle body. The rotation angle may be adjusted based on the area of space available for the exhaust pipe.

Further advantages of the second embodiment include effective use of space. For example, an air cleaner 29 can be provided in a space obtained in front of the engine 17 by inclining the engine 17 backward. Therefore, the exhaust pipe 132 can be provided in a space created behind the engine 17. Additionally, weight balance of the motorcycle body can be improved by inclining the engine 17 backward, and the space formed behind the engine can be effectively used to allow the exhaust pipe 132 to have a sufficient length.

The exhaust pipe 134 can also be enabled to have increased length by forming the downstream side of the intermediate pipe 134 and the rear pipe 35 to extend backward and upward, as described above.

Like the first embodiment, the second embodiment can permit greater ease of assembly, because the front pipe 133 and the intermediate pipe 134 are connected through a connection member on the right side of the rear cushioning member 124. Thus, when the exhaust pipe 132 and the rear cushioning member 124 are assembled, the assembling operation can be carried out in the following order: the front pipe 133, the rear cushioning member 124, and the intermediate pipe 134. This makes improved assembling operability possible, in contrast to a structure in which the front pipe 133 and the intermediate pipe 134 are integrally formed.

Further advantages include maintaining a desired angle (banking angle) at which the motorcycle 1 can be inclined to the right, by providing the muffler 44 above the exhaust port 17f.

While the above description of the first and second embodiments has referred to an off-road-type motorcycle (for off-road racing) as one illustrative example, as described above, embodiments of the invention can be implemented in a variety of forms, including an on-road-type motorcycle such as a motor scooter, or other types of vehicles such as an automobile, a tricycle, or an ATV (All Terrain Vehicle) that have an exhaust pipe connected to a back side of an engine.

Additionally, while the above description has detailed how the front pipe and the intermediate pipe can be connected through the connection member, in alternative embodiments the front pipe and the intermediate pipe can be integrally formed.

Moreover, in the above, it has been described how in the first embodiment, the exhaust pipe can be arranged to extend from the engine along the left side of the rear cushioning member, and then extend transversely to the other side. In alternative embodiments, this arrangement could be reversed: i.e., the exhaust pipe can be arranged to extend from the engine along the right side of the rear cushioning member, and then extend transversely to the other side.

Further, it has been described in the above how, in the first embodiment, the sub-tank can be formed on the right side of the rear cushioning member where the exhaust pipe is not provided. In alternative embodiments, a component such as an ECU (Engine Control Unit), for example, or a battery, may be provided on the right side of the rear cushioning member.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

What is claimed is:

1. A motorcycle, comprising:
an engine;
a rear wheel provided behind the engine;
a rear cushioning member provided between the engine and the rear wheel;
an exhaust pipe connected to a back side of the engine, the exhaust pipe including
a first portion that extends backward on one side of the rear cushioning member, with respect to a widthwise direction of the motorcycle, and
a second portion provided on a downstream side of the first portion and extending, substantially transversely to a lengthwise direction of the motorcycle, from the one side to another side, between the rear cushioning member and the rear wheel; and
a sub-tank of the rear cushioning member on the another side of the rear cushioning member, with respect to the widthwise direction of the motorcycle.

2. The motorcycle according to claim 1, wherein
the engine includes a cylinder having an axial line inclined backward with respect to a substantially vertical line; and
the motorcycle further comprises an air cleaner connected to a front of the engine.

3. The motorcycle according to claim 1, further comprising a connection member and wherein
the first portion includes
a front part connected to the back side of the engine, and
a back part connected to the second portion through the connection member.

4. The motorcycle according to claim 1, wherein
the silencer is provided above an exhaust port of the engine.

5. The motorcycle according to claim 1, further comprising a connection part with the silencer, wherein the third portion extends backward and upward to the connection part with the silencer.

6. The motorcycle according to claim 1, wherein
the sub-tank has an axial center substantially parallel to an axial center of the rear cushioning member.

7. The motorcycle according to claim 1, wherein the motorcycle is for off-road racing.

8. The exhaust pipe of claim 3, wherein the connection member is positioned only on the one side.

* * * * *